United States Patent [19]
Wagers et al.

[11] Patent Number: 5,864,131
[45] Date of Patent: Jan. 26, 1999

[54] SYSTEM AND METHOD FOR ACCURATE GEOLOCATION OF IMAGES

[75] Inventors: Robert Shelby Wagers, Sun Lakes; Mary-Angela Giovanna Cafasso, Phoenix, both of Ariz.

[73] Assignee: Motorola, Inc., Schaumburg, Ill.

[21] Appl. No.: 767,557

[22] Filed: Dec. 16, 1996

[51] Int. Cl.$^6$ .................................................. G01B 11/17
[52] U.S. Cl. ................................. 250/206.2; 250/203.6
[58] Field of Search ........................... 250/206.1, 206.2, 250/203.1, 203.3, 203.4, 203.6, 208.1, 208.2; 356/152.1, 152.2, 152.3, 139.01, 139.03

[56] References Cited

U.S. PATENT DOCUMENTS

| | | | |
|---|---|---|---|
| 4,159,419 | 6/1979 | Wittke | 250/203 |
| 4,523,799 | 6/1985 | Delhaye et al. | 350/6.3 |
| 4,688,091 | 8/1987 | Kamel et al. | 358/109 |
| 4,740,681 | 4/1988 | Tsuno | 356/152 |
| 4,952,809 | 8/1990 | McEwen | 250/206.1 |
| 5,045,937 | 9/1991 | Myrick | 358/109 |
| 5,365,269 | 11/1994 | Holmes et al. | 348/297 |
| 5,517,016 | 5/1996 | Lesh et al. | 250/206.2 |
| 5,525,793 | 6/1996 | Holmes et al. | 250/203.6 |
| 5,557,347 | 9/1996 | Johson | 250/206.2 |

*Primary Examiner*—Stephone B. Allen
*Attorney, Agent, or Firm*—Harold C. McGurk

[57] ABSTRACT

A satellite-based imaging system (100) is used to provide imaging services to users located anywhere on the earth. The surface of the earth is imaged, and the resulting images are geolocated using stars as registration marks on the images. The imaging system comprises a scene imaging system (120) which forms an image of a scene on a first section of a focal plane system (150), a second group of imaging systems (122–128) that form images of unmoving objects, that geolocate the scene on a second group of sections of the same focal plane system (150), and an internal self-consistent system timing mechanism. The satellite-based imaging system (100) stores the images and transmits the images to earth-based processing centers.

25 Claims, 2 Drawing Sheets

SYSTEM AND METHOD FOR ACCURATE GEOLOCATION OF IMAGES

FIELD OF THE INVENTION

The present invention pertains to communication systems and, more particularly, to systems and methods for geolocating images captured by satellite-based imaging systems.

BACKGROUND OF THE INVENTION

Since humans began making recordings there has been an interest in map making. That interest continues today in the form of a major industry involved in the acquisition of land data, and the creation and distribution of maps of the earth and its features. To a smaller extent there is interest in the mapping of other celestial bodies. Most earth feature maps are described with surface distances. This is true even if the map is topographical. However, there are a growing number of applications where the features need to be described with respect to a coordinate system located at a position defined to be the center of the earth. Identifying features and correlating them to this earth-centered coordinate system can be a difficult, expensive operation. Sometimes radio frequency signaling equipment, such as the Global Positioning System (GPS), is used to facilitate geolocating. The coordinate system adopted by GPS is both earth centered and fixed to the earth.

What are needed are a system and method for geolocating images using a less complex, but accurate satellite-based imaging system. What are further needed are a system and method for geolocating images using the optics contained in the main telescope.

DETAILED DESCRIPTION OF A PREFERRED EMBODIMENT

The system and method of the present invention are used to geolocate an image of a scene in a satellite-based imaging system. The system and method of the present invention disclose a system for providing accurate geolocation of images of the earth or other astronomical bodies. The system and method of the present invention has broad application to imagery taken from airborne or space borne platforms. The present invention is especially applicable to images taken from space platforms since these platforms are outside the atmosphere, and thus there is no atmospheric turbulence to disturb star images.

Figure 1:
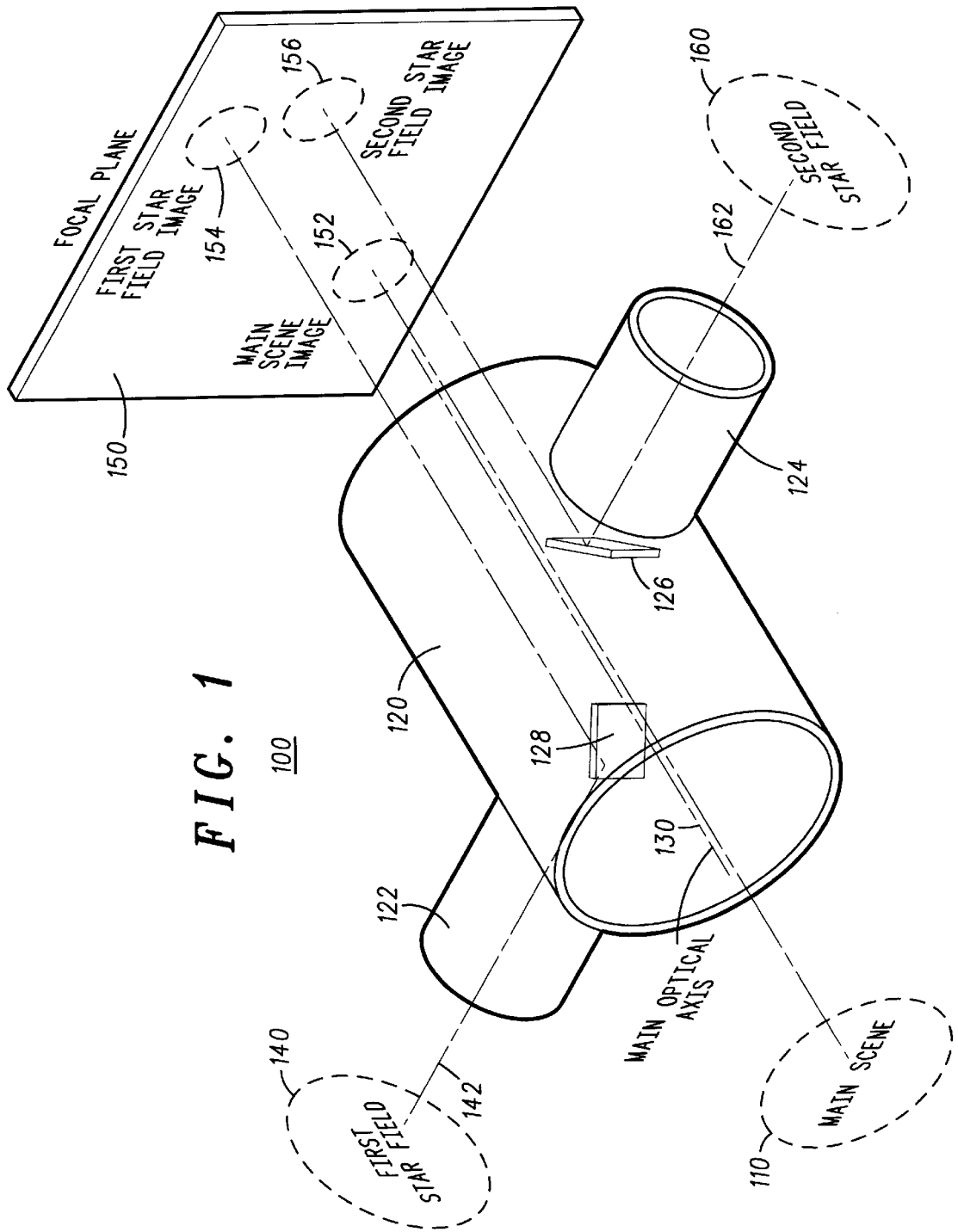
FIG. 1 shows a diagram of a satellite-based imaging system in accordance with a preferred embodiment of the present invention.

FIG. 1 shows a diagram of a satellite-based imaging system in accordance with a preferred embodiment of the present invention. The satellite-based imaging system 100 comprises scene imaging system 120, focal plane system 150, and a second group of imaging systems 122–128. In operation, main scene 110 is focused through scene imaging system 120 onto a section of focal plane system 150. In a preferred embodiment, scene imaging system 120 is a set of optical elements. For example, the set of optical elements could be grouped together in a system such as a telescope. In a preferred embodiment, second group of imaging systems 122–128 are multiple star imaging systems. For example, the multiple star imaging systems could be sets of optical elements configured as telescopes.

A schematic representation of main scene image 152 is shown on focal plane system 150. In a preferred embodiment, main scene image 152 covers the entire focal plane area. In alternate embodiments, main scene image 152 can cover different sections of the focal plane area. In a preferred embodiment, main scene image 152 is an image of a portion of the earth's surface. In alternate embodiments, main scene image 152 could be an image of a portion of the surface of an astronomical body. For example, the astronomical body could be a planet such as Mars or Venus.

While the main optical axis is pointed at main scene 110, multiple star imaging systems 122–128, that are aimed at different angles to main optical axis 130 of scene imaging system 120, point to sections of the heavens and transmit images of stars through the scene imaging system optics to other sections of focal plane system 150. For example, multiple star imaging systems 122–128 can be auxiliary telescope systems. A schematic representation of first star field 140 is shown. A star field is a group of one or more bright stars which are easily viewable at a particular time. In a preferred embodiment, two or more of the bright stars are used as fixed objects to geolocate an image. In alternate embodiments, other substantially stationary objects could be used to geolocate an image.

First auxiliary optical imaging system 122 is shown in FIG. 1. In a preferred embodiment of the present invention, first auxiliary optical imaging system 122 is part of multiple star imaging systems 122–128. First auxiliary optical imaging system 122 is an optical system which is used to allow light from first star field 140 to enter scene imaging system 120. Line of sight 142 to first star field 140 is shown in FIG. 1. Directing system 128 is shown which is used to cause light rays from first star field 140 to be directed parallel to main optical axis 130. In a preferred embodiment of the present invention, directing system 128 is part of multiple star imaging systems 122–128.

A schematic representation of first star field image 154 is shown on focal plane system 150. In a preferred embodiment, first star field image 154 covers the entire focal plane area. In alternate embodiments, first star field image 154 can cover different sections of the focal plane area.

In addition, a schematic representation of second star field 160 is shown in FIG. 1. Also, second auxiliary optical imaging system 124 is shown in FIG. 1. In a preferred embodiment of the present invention, second auxiliary optical imaging system 124 is part of multiple star imaging systems 122–128. Second auxiliary optical imaging system 124 is an optical system which is used to allow light from second star field 160 to enter scene imaging system 120. Line of sight 162 to second star field 160 is also shown. Another directing system 126 is shown which is used to cause light rays from second star field 160 to be directed parallel to main optical axis 130. In a preferred embodiment of the present invention, directing system 126 is part of multiple star imaging systems 122–128.

Also, a schematic representation of second star field image 156 is shown on focal plane system 150. In a preferred embodiment, second star field image 156 covers the entire focal plane area. In alternate embodiments, second star field image 156 can cover different sections of the focal plane area. In a preferred embodiment, the focal plane area is a mosaic of focal planes. In a preferred embodiment, main scene image 152, first star field image 154, and second star field image 156 are used to form a composite image.

In this manner, a composite image is formed on the focal plane which comprises a main scene section, and multiple sections of star images. These images are uniquely correlated at the instant of image formation. When the composite focal plane is recorded by either photographic or electronic means, each frame of scene information has recorded with it accurate, unmoving star images that can be used to determine the angle of the main telescope optic axis with respect to the stars. This pointing direction in combination with the coordinates of the platform and the time at which the images were formed can be used to unambiguously define rays from the platform to the scene, thus geolocating the scene on the earth in all respects except for the range from the platform to the scene elements. The range can be determined by looking at the same scene from two or more different platform locations and calculating the position of intersection of the rays from the several viewing locations. Alternatively, the ray can be used in combination with earth terrain elevation data to find the height of features on the image.

Figure 2:
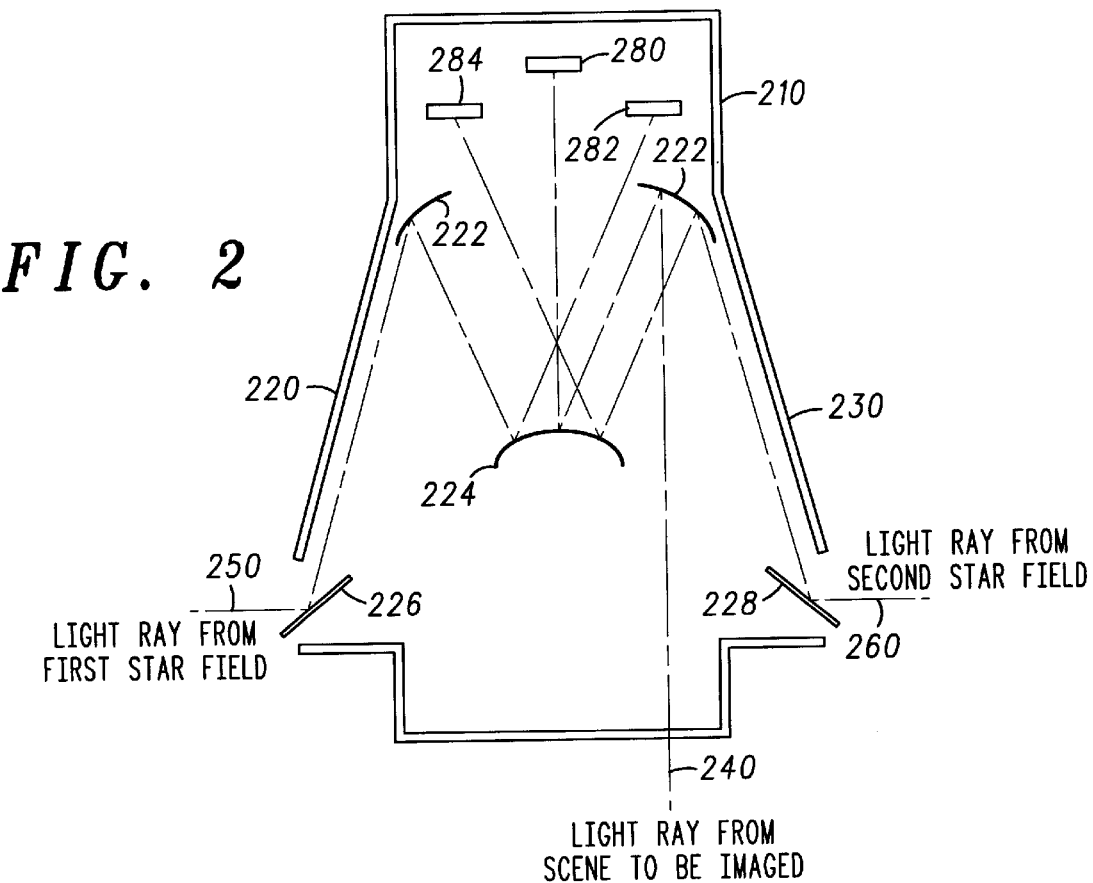
FIG. 2 shows a block diagram of an imaging portion of a satellite-based imaging system in accordance with a preferred embodiment of the present invention.

FIG. 2 shows a block diagram of an imaging portion of a satellite-based imaging system in accordance with a preferred embodiment of the present invention. A preferred embodiment of this present invention has three optical systems in one structural assembly. One optical system is imaging telescope, and the other two are star sensing systems. Light rays 240 from the scene enter imaging telescope 210 along the main optical axis. Light rays 240 are reflected from a first mirror which is primary mirror 222. Light rays 240 travel to a second mirror which is secondary mirror 224. Light rays 240 are then reflected from secondary mirror 224. Finally, light rays 240 travel to imaging focal plane where the image is focused on receiving system 280 such as a solid state semiconductor focal plane array or photographic film. In a preferred embodiment, secondary mirror 224 is secured with struts that maintain its position relative to primary mirror 222. These struts lie within the optical path of the incoming scene illumination, but subtend only a small portion of the total light entering the telescope.

In a preferred embodiment, two star imaging systems 220, 230 which are perpendicular to each other admit light from star fields. Light rays 250 from a first star field enter star imaging system 220. Light rays 250 are first directed by directing system 226 to primary mirror 222. From primary mirror 222, light rays 250 travel to secondary mirror 224. At secondary mirror 224, light rays 250 are reflected to receiving system 282, such as a solid state semiconductor focal plane array or photographic film.

Light rays 260 from a second star field enter star imaging system 230. Light rays 260 are first directed by a second directing system 228 to primary mirror 222. From primary mirror 222, light rays 260 travel to secondary mirror 224. At secondary mirror 224, light rays 260 are reflected to receiving system 284, such as a solid state semiconductor focal plane array or photographic film. In a preferred embodiment of the present invention, receiving system 280, receiving system 282 and receiving system 284 are all part of one focal plane system. Those skilled in the art will recognize that the relationships between receiving systems 280–284 must be known.

In a preferred embodiment, star imaging directing systems 226, 228 are reflecting surfaces that direct star light to primary mirror 222. For example, the reflecting surfaces can be mirrors. In alternate embodiments, star imaging directing systems 226, 228 could be optical systems comprising several components. In a preferred embodiment, star imaging directing systems 226, 228 are supported by the same strut system that supports the secondary mirror. This means of support provides for maximum structural stability of the coupled mirror systems. Additionally, since a preferred embodiment senses stars by using the same optical system as the main telescope (plus a reflecting surface) this embodiment provides for maximum stability of the angular relation between the telescope optical axis and any star imaging system viewing direction.

In a preferred embodiment, the combined telescope and star sensing assembly has two ports for star sensing. In a preferred embodiment, these two ports have viewing directions at right angles to each other. By changing the angle of the reflecting surfaces of the two star ports, many arrangements of the viewing directions of the star ports relative to the optic axis are possible. There are two alternate orientations for these star viewing angles. In one alternate embodiment, the two star viewing directions are perpendicular to the optic axis of the main telescope. In another embodiment, one of the star viewing directions is approximately opposite to the viewing direction of the main telescope, while the other star viewing direction is perpendicular to the optic axis of the main telescope.

Figure 3:
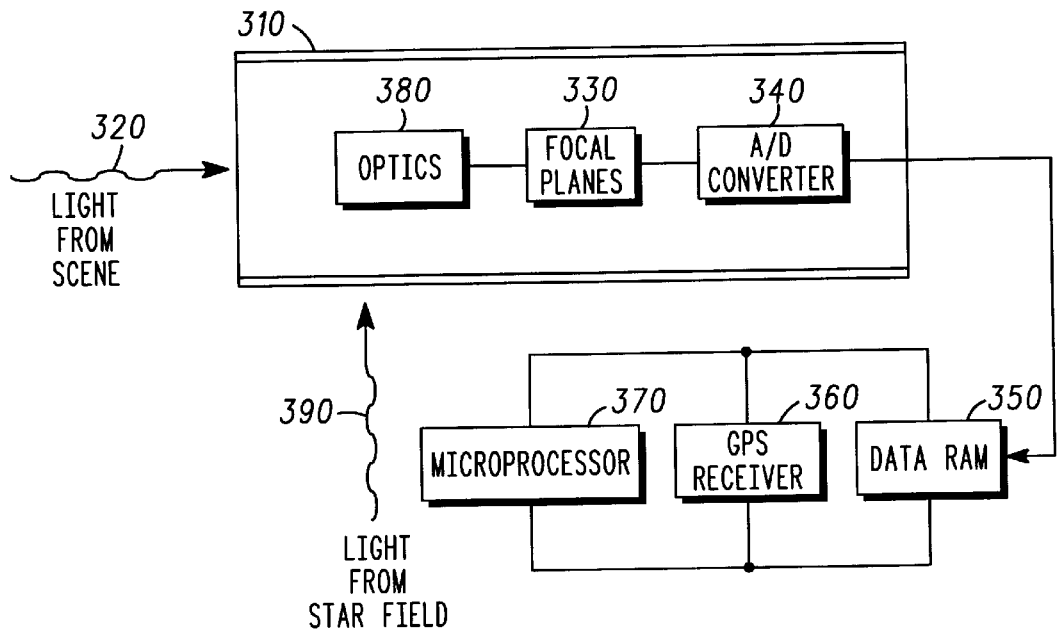
FIG. 3 shows a block diagram of a satellite-based imaging system in accordance with a preferred embodiment of the present invention.

FIG. 3 shows a block diagram of a satellite-based imaging system in accordance with a preferred embodiment of the present invention. This block diagram shows a telescope/star imaging system in concert with electronics employed to carry out geolocation of image features. Telescope body 310 supports both the main imaging system and the star imaging systems. Optics 380, focal planes 330, and analog to digital (A/D) converters 340 are shown within telescope body 310. Light rays 320 from a scene to be imaged enter the telescope, and the scene is imaged on focal planes 330 by optics 380. Other light rays 390 from stars are also imaged on focal planes 330 by optics 380. Electronic A/D converters 340 transform the image to a digital format and enter the image into memory 350. An integral component in the satellite-based imaging system is a timing mechanism which can be used to time-stamp the images. In a preferred embodiment, GPS receiver system 360 is interrogated, and the GPS coordinates and GPS time are stored in memory 350. The GPS coordinates and the GPS time are assigned to the images recorded by the telescope/star imaging system. Computer system 370 that has access to the stored images, coordinates, and time stored in memory 350 carries out calculations to obtain the earth centered coordinates of features of the images.

The present invention has been described above with reference to a preferred embodiment. However, those skilled in the art will recognize that changes and modifications can be made in this embodiment without departing from the scope of the present invention. For example, while various embodiments have been described in terms of image capturing systems, other descriptions or methods can also be employed. In addition, the present invention need not be restricted to use only in connection with a satellite-based imaging system. Those skilled in the art may easily adapt the teaching of the present invention to any other system which could use star tracking. Accordingly, these and other changes and modifications which are obvious to those skilled in the art are intended to be included within the scope of the present invention.

We claim:

1. A method for operating an imaging system comprising the steps of:

forming a scene image on a first section of a focal plane using a main scene imaging system; and forming simultaneously other images of fixed objects on a second section of the focal plane using auxiliary optical imaging systems for geolocating the scene image.

2. The method as claimed in claim 1, wherein the fixed objects are stars.

3. The method as claimed in claim 1, wherein the focal plane is a mosaic of focal planes.

4. The method as claimed in claim 1, wherein the fixed objects are substantially stationary.

5. The method as claimed in claim 1, further comprising the step of locating the fixed objects in space.

6. The method as claimed in claim 1, wherein the scene image is a portion of a surface of the earth.

7. The method as claimed in claim 1, wherein the scene image is a portion of a surface of an astronomical body.

8. A method for operating an imaging system, comprising the steps of:

forming a scene image on a first section of a focal plane using a main scene imaging system;

forming simultaneously other images of fixed objects on a second section of the focal plane for geolocating the scene image by coupling a second group of imaging system to optics which are along a main optical axis in the main scene imaging system and by using the second group of imaging systems and the main scene imaging system to focus the other images onto the second section of the focal plane.

9. The method as claimed in claim 8, wherein the main scene imaging system is a telescope.

10. The method as claimed in claim 8, wherein the first section is substantially all of the focal plane.

11. The method as claimed in claim 8, wherein the second section is substantially all of the focal plane.

12. The method as claimed in claim 8, wherein the step of coupling comprises the step of performing the coupling using mirrors.

13. The method as claimed in claim 8, wherein the second group of imaging systems comprises two or more sets of optical elements with lines of sight substantially perpendicular to the main optical axis of the main scene imaging system.

14. The method as claimed in claim 8, wherein the second group of imaging systems comprises two or more sets of optical elements with lines of sight substantially not perpendicular to the main optical axis of the main scene imaging system.

15. The method as claimed in claim 8, wherein the second group of imaging systems comprises two or more sets of optical elements and wherein at least one set of optical elements has a line of sight substantially perpendicular to the main optical axis of the main scene imaging system.

16. The method as claimed in claim 8, wherein the second group of imaging systems comprises two or more sets of optical elements and wherein at least one set of optical elements has a line of sight substantially parallel to the main optical axis of the main scene imaging system.

17. The method as claimed in claim 8, wherein the second group of imaging systems comprises two or more telescopes.

18. The method as claimed in claim 8, further comprising the steps of correlating the scene image to an earth-based coordinate system.

19. The method as claimed in claim 8, further comprising the steps of correlating the scene image to an imaging platform coordinate system.

20. The method as claimed in claim 8, further comprising the step of time-stamping the scene image when the scene image is formed.

21. An imaging system comprising:

a first optical imaging system which can form an image of a scene on a first section of a focal plane;

a second group of auxiliary optical imaging systems, coupled to the first optical imaging system, that can form images of unmoving objects that geolocate the scene on a second group of sections of the focal plane; and a system timing mechanism for time-stamping the image.

22. The system as claimed in claim 21, wherein the focal plane is a mosaic of focal planes.

23. The system as claimed in claim 21, wherein the first imaging system is a telescope.

24. The system as claimed in claim 21, wherein at least one of the second group of imaging systems is separate from the first imaging system.

25. The system as claimed in claim 21, wherein the imaging system is located on a satellite.

* * * * *

UNITED STATES PATENT AND TRADEMARK OFFICE
CERTIFICATE OF CORRECTION

PATENT NO. : 5,864,131

DATED : November 4, 1997

INVENTOR(s) : M. Lebl, et al.

It is certified that error appears in the above-identified patent and that said Letters Patent is hereby corrected as shown below:

At column 18, line 63, claim 8, the patent reads "procedes" and should read --precedes--.

Signed and Sealed this

Twenty-fourth Day of August, 1999

Attest:

Q. TODD DICKINSON

*Attesting Officer*     *Acting Commissioner of Patents and Trademarks*